United States Patent
Baneu et al.

(10) Patent No.: US 10,189,455 B2
(45) Date of Patent: Jan. 29, 2019

(54) METHOD FOR PERFORMING A BRAKING MANEUVER USING A VEHICLE BRAKING ASSISTANT

(71) Applicant: Conti Temic microelectronic GmbH, Nuremberg (DE)

(72) Inventors: Mihai Baneu, Lindau (DE); Guido Fuchs, Carpinteria, CA (US); Mario Goetz, Jettingen (DE); Helmut Steurer, Junkenhofen/Geroisbach (DE); Armin Vogl, Obergriesbach (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 15/326,568

(22) PCT Filed: Jul. 6, 2015

(86) PCT No.: PCT/DE2015/200400
§ 371 (c)(1),
(2) Date: Jan. 16, 2017

(87) PCT Pub. No.: WO2016/015727
PCT Pub. Date: Feb. 4, 2016

(65) Prior Publication Data
US 2017/0210367 A1    Jul. 27, 2017

(30) Foreign Application Priority Data
Jul. 28, 2014   (DE) .................. 10 2014 214 748

(51) Int. Cl.
*B60T 7/22*     (2006.01)
*B60T 8/32*     (2006.01)
(Continued)

(52) U.S. Cl.
CPC ............ *B60T 8/74* (2013.01); *B60K 31/0008* (2013.01); *B60T 7/22* (2013.01); *B60T 8/172* (2013.01);
(Continued)

(58) Field of Classification Search
None
See application file for complete search history.

(56) References Cited

U.S. PATENT DOCUMENTS 4,860,210 A * 8/1989 McCombie ............ B60K 31/10
6,076,622 A * 6/2000 Chakraborty et al.
(Continued)

FOREIGN PATENT DOCUMENTS

DE           29 00 461        7/1980
DE         102005033087       1/2007
(Continued)

OTHER PUBLICATIONS

English translation of DE102007043419A1 (Jun. 11, 2018) (Year: 2018).*
(Continued)

*Primary Examiner* — Jean Paul Cass
(74) *Attorney, Agent, or Firm* — W. F. Fasse

(57) ABSTRACT

In a braking maneuver using a braking assistant (9) in a motor vehicle (3), the braking assistant (9) initiates an automatic braking maneuver when an actual distance (a) between the motor vehicle (3) and an object (5) located ahead of the motor vehicle (3) becomes less than a specified minimum distance ($a_{min}$). Then an acceleration of the decelerating vehicle (3) is ascertained during the braking maneuver, and if the acceleration is positive then the braking maneuver initiated by the braking assistant (9) is automatically interrupted.

10 Claims, 1 Drawing Sheet

(51) Int. Cl.
*B60T 8/74* (2006.01)
*B60K 31/00* (2006.01)
*B60T 8/172* (2006.01)
*B60W 30/16* (2012.01)

(52) U.S. Cl.
CPC ............ *B60T 8/321* (2013.01); *B60T 8/3205* (2013.01); *B60W 30/16* (2013.01); *B60T 2201/022* (2013.01); *B60T 2201/03* (2013.01)

(56) References Cited

U.S. PATENT DOCUMENTS

| | | | | |
|---|---|---|---|---|
| 6,112,719 | A * | 9/2000 | Earleson | G05B 13/024 123/352 |
| 6,369,536 | B2 * | 4/2002 | Beifus | H02P 6/08 318/400.12 |
| 6,681,877 | B2 * | 1/2004 | Ono | B60K 31/04 123/351 |
| 8,266,620 | B2 * | 9/2012 | Kissell | G06F 9/3851 718/100 |
| 8,301,341 | B2 * | 10/2012 | Taguchi | B60T 7/042 701/41 |
| 8,738,264 | B1 | 5/2014 | Yopp et al. | |
| 9,085,237 | B2 * | 7/2015 | Kii | B60K 31/18 |
| 9,254,749 | B2 * | 2/2016 | Wang | B60K 31/00 |
| 9,557,736 | B1 * | 1/2017 | Silver | G06K 9/00812 |
| 9,841,762 | B2 * | 12/2017 | Moran | B60W 30/085 |
| 2009/0018723 | A1 * | 1/2009 | Chevion | B60W 50/16 701/36 |
| 2009/0234543 | A1 | 9/2009 | Groitzsch et al. | |
| 2009/0299552 | A1 * | 12/2009 | Villaume | G08G 1/22 701/3 |
| 2010/0017084 | A1 * | 1/2010 | Riegel | B60Q 9/004 701/70 |
| 2010/0134263 | A1 | 6/2010 | Mathony et al. | |
| 2011/0190998 | A1 * | 8/2011 | Kato | B60T 7/22 701/70 |
| 2013/0030606 | A1 * | 1/2013 | Mudalige | G08G 1/22 701/2 |
| 2013/0219294 | A1 * | 8/2013 | Goldman-Shenhar | G06F 3/0484 715/751 |
| 2013/0231824 | A1 * | 9/2013 | Wilson | G05D 1/0246 701/26 |
| 2014/0303827 | A1 * | 10/2014 | Dolgov | B60W 30/00 701/23 |
| 2016/0347310 | A1 * | 12/2016 | Moran | B60W 30/09 |
| 2017/0248949 | A1 * | 8/2017 | Moran | B60W 30/085 |
| 2017/0248950 | A1 * | 8/2017 | Moran | G08G 1/165 |
| 2017/0320492 | A1 * | 11/2017 | Ferrari | B60W 30/0953 |
| 2018/0037260 | A1 * | 2/2018 | Otake | B62D 15/025 |

FOREIGN PATENT DOCUMENTS

| | | |
|---|---|---|
| DE | 102007043419 | 3/2008 |
| WO | WO 02/062640 | 8/2002 |

OTHER PUBLICATIONS

International Search Report of the International Searching Authority for International Application PCT/DE2015/200400, dated Dec. 10, 2015, 2 pages, European Patent Office, HV Rijswijk, Netherlands.
PCT International Preliminary Report on Patentability including English Translation of PCT Written Opinion of the International Searching Authority for International Application PCT/DE2015/200400, dated Jan. 31, 2017, 7 pages, International Bureau of WIPO, Geneva, Switzerland.
German Search Report for German Patent Application No. 10 2014 214 748.4, dated Mar. 23, 2015, 8 pages, Muenchen, Germany, with English translation, 6 pages.

* cited by examiner

METHOD FOR PERFORMING A BRAKING MANEUVER USING A VEHICLE BRAKING ASSISTANT

FIELD OF THE INVENTION

The invention relates to a method of performing or controlling an automated braking maneuver by a vehicle braking assistant system.

BACKGROUND INFORMATION

A driver assistance system is nowadays often part of the standard equipment of a modern motor vehicle. The purpose of such a driver assistance system is to increase highway safety by taking precautions to avoid hazard situations that could lead to accidents. Further aims are to increase comfort by unburdening the driver and to facilitate orientation by providing information on the surroundings that is situation-dependent and makes sense to the driver.

A driver assistance system can intervene semi-autonomously or autonomously in the propulsion, control or signaling devices of the vehicle, warn the driver shortly before or during a critical situation or prevent the latter by independent intervention. Here a driver assistance system is designed so that the responsibility rests with the driver and the latter can therefore override autonomous interventions.

Here a brake assist system, or "brake assistant" for short, is particularly important. In hazard situations, in which emergency braking is necessary, to avoid a collision, the brake pedal is often depressed with excessive hesitancy. In this case the brake assistant ensures maximum brake servo pressure and thus generally the minimum braking distance.

Emergency brake assist (EBA), by way of example, detects critical traffic situations and ensures optimum braking. To this end the entire area ahead of the vehicle itself is continuously monitored by means of a suitable sensor for distance and speed measurement, such as for example radar, LIDAR (Light Detection And Ranging) or a camera. In this way, other vehicles that are either stationary or moving, or general obstructions on the highway, are captured. If the distance between the vehicle itself and a vehicle travelling ahead of it falls below a level that at the current vehicle speed is deemed critical, the driver is alerted and/or the brake system performs a slight pre-braking, to reduce the braking distance. If the driver then moves their foot from the gas pedal to the brake, the brake assistant simultaneously increases the braking force. If the driver then actively contributes to the braking maneuver, the system provides the necessary braking force to prevent a collision with the vehicle travelling ahead or with other highway users.

If a driver encounters a situation in which, by way of example due to inattentiveness or an unexpected obstruction, they can no longer brake independently and if a collision with an unexpected obstruction is imminent, by means of an autonomous full braking function (autonomous emergency braking—AES) a braking assistant can initiate a fully automatic emergency braking. In this way, the accident can either be completely avoided or at least the seriousness of it lessened.

However, such a full braking function becomes particularly problematic if the direction of travel of the vehicle itself (ego-vehicle or subject vehicle) is unknown. If another vehicle ahead of the ego-vehicle is reversing, then to avoid a collision it is also necessary for the ego-vehicle to reverse. But if the reversing or backward-rolling vehicle ahead is moving faster than the ego-vehicle itself is moving, then the distance between the vehicles lessens and in the worst case falls below the specified critical minimum distance value. In this case a braking assistant, having no knowledge of the direction of travel, commences a braking maneuver, whereby the distance between the two vehicles undesirably reduces further. In such a situation, a collision is almost unavoidable.

SUMMARY OF THE INVENTION

A first object of the invention is to indicate a method allowing a braking assistant, even if it does not know the direction of travel of the vehicle, to reduce the danger of, or ideally completely avoid, a collision with other highway users.

The first object is achieved according to the invention by a method for performing a braking maneuver using a motor vehicle braking assistant in a vehicle, wherein the braking assistant initiates an automated braking maneuver when a distance between the motor vehicle and an object located ahead of the vehicle is less than a minimum distance $a_{min}$, wherein an acceleration signal of the decelerating vehicle is ascertained, and wherein if the acceleration signal is positive the braking maneuver performed by the braking assistant is automatically interrupted.

In a first step the invention is based initially on the concept that to avoid the problem described above the direction of travel needs to be captured. This could take place, by way of example, by means of reversing sensors. But with such reversing sensors, which provide information that the reverse gear is selected, there is a danger of misinterpretation. Such misinterpretations can, by way of example, occur if a driver allows their vehicle to roll backwards, without selecting reverse gear. The direction of travel will also be falsified if a driver selects reverse gear but allows the vehicle to roll forwards by depressing the clutch.

Alternatively, what are known as intelligent wheel sensors could be used which, indicate not only the speed of rotation but also the direction of rotation thereby allowing a clear identification of the direction of movement. Due to the high costs, such wheel sensors are only used in high-end vehicles.

A surprising finding by the invention in a second step is that it is possible, even if the direction of travel is not known, to provide a reliable and inexpensive solution for avoiding a collision if an acceleration sensor is used. With the acceleration signal, in a particularly simple way using its sign, the direction of travel of the vehicle can be ascertained and, in the event of an impending collision, a braking maneuver previously initiated automatically by a braking assistant is interrupted. Thus, a collision due to rolling backwards can be easily avoided or at least the damage limited.

To this end the acceleration signal of the vehicle is suitably evaluated taking account of the sign, wherein essentially a distinction can be made between two possibilities.

If a vehicle equipped with a braking assistant is travelling in the forwards direction behind another vehicle and if the other vehicle begins to brake, then the distance between the vehicles reduces and the braking assistant initiates an automatic braking maneuver when the distance becomes less than a specified minimum distance value. During a corresponding braking maneuver from the forward travel, the acceleration signal takes a negative value, meaning that the speed of the vehicle in the forwards direction reduces (deceleration). The braking maneuver is accordingly continued until the distance between the two vehicles increases until it again corresponds to the specified minimum distance.

In this case the braking assistant does not initiate an immediate interruption of the braking maneuver. The braking maneuver is deliberate and leads to an intended result, namely an increase in the distance between the two vehicles.

If, instead, two vehicles moving backwards are considered, moving at different speeds, in a conventional braking assistant with no knowledge of the direction of travel there is an increased danger of a collision. If the other vehicle ahead of the ego-vehicle is rolling back more quickly than the ego-vehicle itself, then here also the distance between the two vehicles reduces until after a certain time it is below the specified minimum distance. Without knowing the direction of travel, the braking assistant automatically initiates a corresponding braking maneuver, which in the worst case leads to a collision.

Unlike a braking maneuver from forward travel, however, with a braking maneuver from backward travel the speed in the backwards direction reduces, and the acceleration signal during a braking maneuver from a backward movement takes a correspondingly positive value. If this positive value is ascertained as an acceleration signal, i.e. if this is detected or interpreted as a gain in speed, then the braking maneuver is automatically interrupted by the braking assistant. In this case only the discontinuation of the braking maneuver will lead to the desired result, namely increasing the distance between the two vehicles.

Overall, the method thus allows, irrespective of direct knowledge of the direction of travel of a motor vehicle, safe and reliable functioning of a braking assistant. Knowledge of the direction of travel is obtained indirectly from the sign of the acceleration during an initiated braking maneuver.

Essentially the acceleration signal can be obtained with the help of the most varied of sensors or cameras, such as for example with the help of what is known as the egomotion camera from the optical flow or similar.

In an advantageous configuration of the invention, the acceleration signal is ascertained by means of an onboard acceleration sensor. Such an acceleration sensor provides reliable results and can also be used in budget-priced vehicles in the low-cost segment, so that a braking assistant is no longer used only in high-price vehicles. By way of example, acceleration sensors are used to trigger the airbag and where piezo technology is used are relatively cheap. The acceleration signals are accessible via the vehicle CAN (Controller Area Network). The acceleration signal can be used for evaluating the change in speed.

Advantageously, the current speed change of the vehicle is ascertained based on the acceleration signal. It is particularly advantageous if the current change in speed of the vehicle is ascertained by integration of the acceleration signal. Integrating the acceleration signal to ascertain the change in speed allows an erroneous response to be avoided to the acceleration peaks that can occur during high-frequency scanning with both positive and negative signs, even if the entire process overall only takes place in one direction.

The value of the integrated speed can particularly be used as a criterion for maintaining or interrupting the intervention, so that in the event of erroneous braking in the backward movement the danger to an occupant is minimized. To this end, a speed threshold can be specified which is compared with the integrated speed value.

The acceleration signal can be integrated in various ways. Here the advantage of integration is the smoothing of the acceleration signal and thus the minimization of an incorrect response. For acceleration integration, a window integral with low-pass function is preferably used. Here the area below the window width of the window integral represents a speed value which is used to evaluate the situation.

It is also advantageous if a continuous integrator is used as an acceleration integrator. This continuous integrator is continuously "cleared" with a constant speed value and reset to zero, wherein the clearing takes place so that for a positive content of the integrator a constant value is deducted and for a negative content of the integrator a constant value is added. In both types of integration, thus both for a positive and a negative content, the interruption criterion is met if, despite a braking maneuver, in the integral of the acceleration signal a gain in speed is established which is above a pre-adjustable value.

BRIEF DESCRIPTION OF THE DRAWINGS

In the following exemplary embodiments of the invention are explained in more detail using a drawing. This shows as follows.

DETAILED DESCRIPTION OF EXAMPLE EMBODIMENTS OF THE INVENTION

Figure 1:
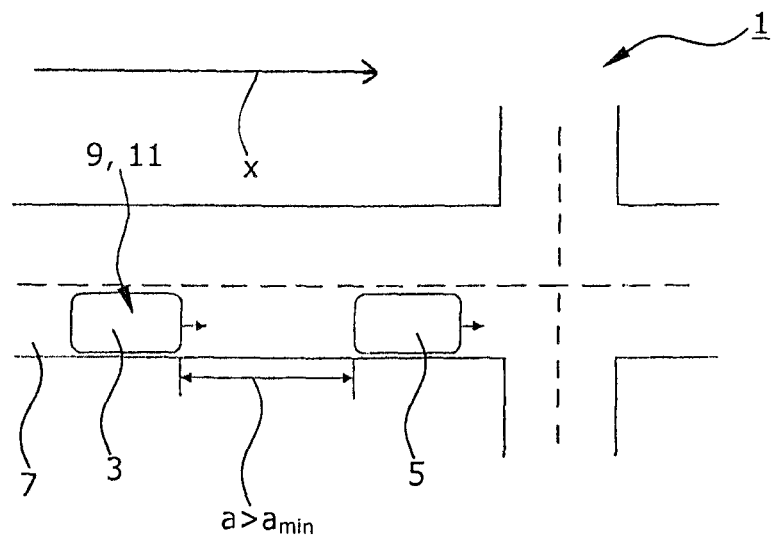
FIG. 1 a first traffic situation with two vehicles following one behind the other in a forward travel direction, and maintaining more than a specified minimum distance ($a_{min}$) between the vehicles, and FIG. 2 a second traffic situation with the two vehicles travelling backwards, and where the actual distance (a) falls below the specified minimum distance ($a_{min}$).

FIG. 1 shows a traffic situation 1, in which an ego-vehicle or subject vehicle 3 and an object located ahead of the ego-vehicle 3, e.g. another vehicle 5, are travelling one behind the other in a lane 7 in the same direction of movement x, in forwards direction, at a distance a. The distance between the two vehicles is above a specified minimum distance $a_{min}$ ($a > a_{min}$).

The ego-vehicle 3 is equipped with a braking assistant 9 with an acceleration sensor 11. By means of the braking assistant 9, in the event of an impending collision, when therefore the other vehicle 5 brakes, a braking maneuver of the ego-vehicle 3 is initiated. Here the acceleration sensor 11 ascertains the acceleration of the ego-vehicle 3. The braking assistant 9 uses the sign of the ascertained acceleration signal to ascertain the direction of movement of the ego-vehicle 3.

In this case, when the other vehicle 5 brakes, the distance a between the two vehicles 3,5 reduces and the braking assistant 9 initiates a braking maneuver when the distance a falls below the specified minimum distance $a_{min}$, in order to restore the required minimum distance $a_{min}$. The speed of the ego-vehicle 3 reduces in the forwards direction due to the braking. The acceleration signal accordingly takes a negative value. The braking maneuver is accordingly continued until the minimum distance $a_{min}$ has been achieved again.

Figure 2:
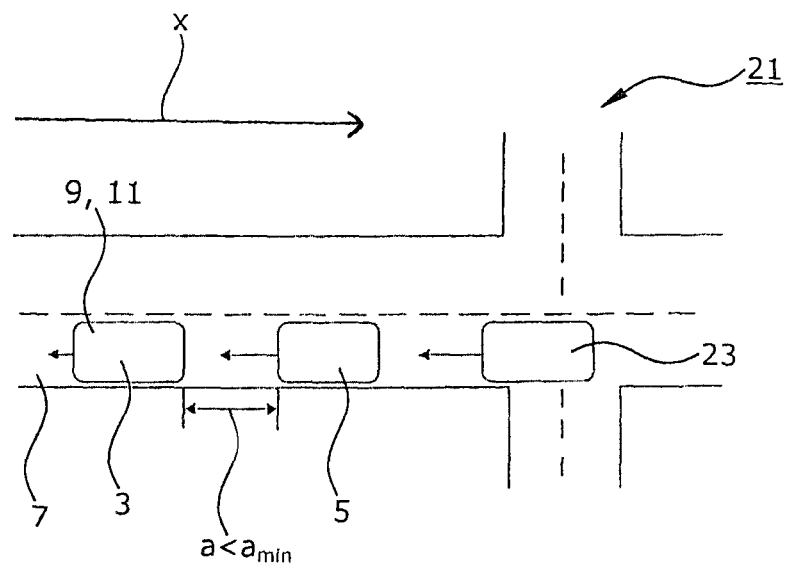

In the traffic situation 21 shown in FIG. 2, in addition to the two vehicles 3, 5 there is an obstruction in the form of a further vehicle 23 that is backing or reversing in the lane 7. The other vehicle 5 located ahead of the ego-vehicle 3 is accordingly travelling backwards to avoid the obstruction 23. At the same time the ego-vehicle 3 is also travelling backwards, to avoid a collision with the other vehicle 5.

In this case, however, the other vehicle 5 is travelling backwards faster than the ego-vehicle 3, so that the distance a between the two vehicles 3, 5 falls to a level below the critical specified minimum distance $a_{min}$ ($a < a_{min}$). Because the actual distance a is below the minimum distance $a_{min}$ the braking assistant 9, which has no knowledge of the direction of travel, thus in this case the backwards direction, initiates a braking maneuver, in an attempt to increase the distance between the two vehicles 3, 5.

The response by the braking assistant 9 would thus lead to the actual collision between the two vehicles 3, 5 that is to be avoided. Through further intervention of the braking assistant 9, however, such a collision is prevented. By ascertaining the acceleration, the starting direction of movement of the vehicle 3 is ascertained. The acceleration signal ascertained by means of the acceleration sensor 11 in this case takes a positive value during the braking maneuver. In this case the initiated braking maneuver is interrupted by the braking assistant 9 and thus a collision between the two vehicles 3,5 is avoided or at least the seriousness of the consequences of such a collision is reduced.

LIST OF REFERENCE NUMERALS

1 Traffic situation
3 Ego-vehicle
5 Object
7 Lane
9 Braking assistant
11 Acceleration sensor
21 Traffic situation
23 Obstacle

The invention claimed is:

1. A method of performing a braking maneuver using a braking assistant in a motor vehicle, wherein:
   the braking assistant initiates an automatic braking maneuver when a distance between the motor vehicle and an object located ahead of the motor vehicle is less than a predetermined minimum distance,
   an acceleration of the motor vehicle during the automatic braking maneuver is ascertained, wherein the acceleration is defined as positive for an increasing speed in a forward travel direction of the motor vehicle and for a decreasing speed in a backward travel direction of the motor vehicle,
   a current change in speed of the motor vehicle is ascertained by integration of the acceleration using an acceleration integrator,
   excluding determining a direction of travel of the motor vehicle other than as indicated indirectly by the ascertained acceleration being positive or negative, and
   when the ascertained acceleration is positive, in response thereto the automatic braking maneuver is automatically interrupted.

2. The method according to claim 1, wherein the acceleration is ascertained as an acceleration signal by an onboard acceleration sensor.

3. The method according to claim 1, a low-pass filter is used as the acceleration integrator.

4. The method according to claim 1, wherein the current change in speed of the motor vehicle is compared with a specified speed threshold.

5. The method according to claim 4, wherein, when the current change in speed exceeds the specified speed threshold, the automatic braking maneuver is automatically interrupted.

6. A method of braking a motor vehicle with an automatic braking assistant system of the motor vehicle, comprising steps:
   a) initiating an automatic braking of the motor vehicle with the automatic braking assistant system;
   b) while the automatic braking is proceeding, with a sensor of the motor vehicle producing a sensor signal that is indicative of an acceleration of the motor vehicle, and evaluating the sensor signal to determine a sign of the acceleration, wherein the sign of the acceleration is defined as positive for an increasing speed in a forward travel direction of the motor vehicle and for a decreasing speed in a backward travel direction of the motor vehicle;
   c) ascertaining a current change in speed of the motor vehicle by integrating the acceleration using an acceleration integrator;
   d) excluding determining a direction of travel of the motor vehicle other than as indicated indirectly by the sign of the acceleration; and
   e) when the sign of the acceleration is positive while the automatic braking is proceeding, then in response thereto automatically interrupting the automatic braking of the motor vehicle with the automatic braking assistant system.

7. The method according to claim 6, further comprising the step:
   when the sign of the acceleration is negative while the automatic braking is proceeding, then in response thereto automatically continuing the automatic braking of the motor vehicle with the automatic braking assistant system.

8. The method according to claim 6, wherein the step a) comprises detecting a spacing distance between the motor vehicle and an object located in front of the motor vehicle, comparing the detected spacing distance to a distance threshold, and when the detected spacing distance falls below the distance threshold then in response thereto performing the initiating of the automatic braking of the motor vehicle.

9. The method according to claim 8, further comprising the step:
   when the sign of the acceleration is negative while the automatic braking is proceeding, then in response thereto automatically continuing the automatic braking of the motor vehicle with the automatic braking assistant system.

10. The method according to claim 1, wherein when the ascertained acceleration is negative, in response thereto the automatic braking maneuver is automatically continued.

\* \* \* \* \*